Oct. 28, 1969  F. F. DAUENHAUER  3,474,895
VINE CARRIER FOR HOP PICKING MACHINE
Filed Jan. 4, 1968
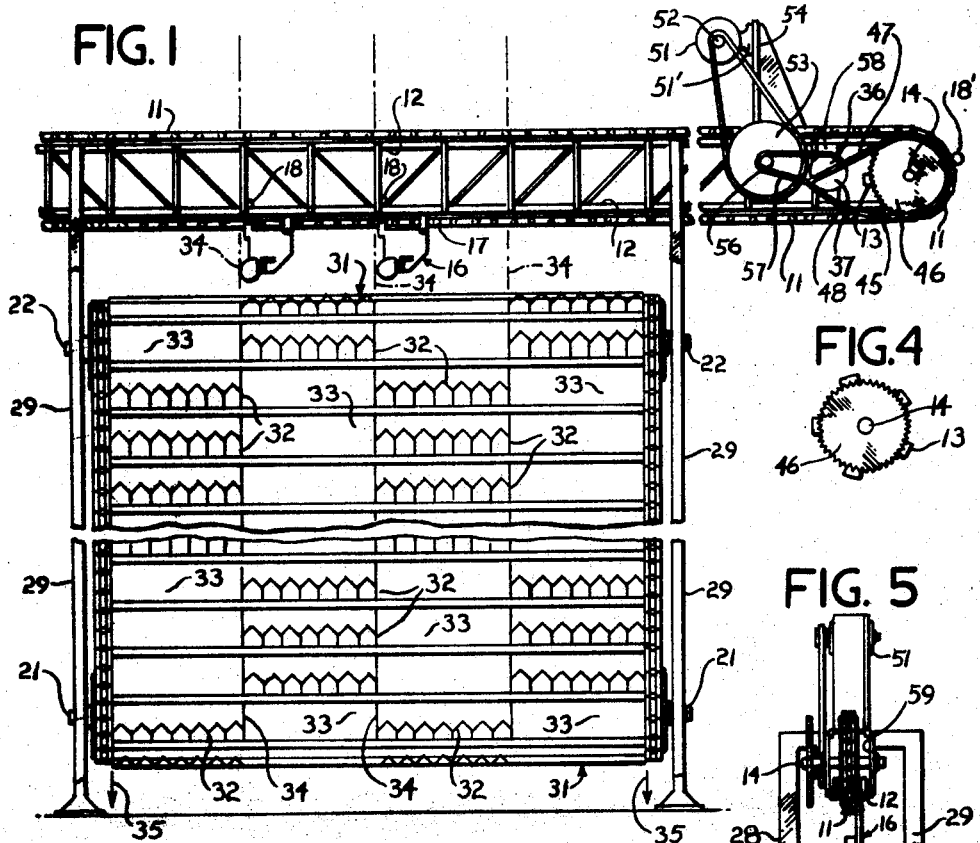
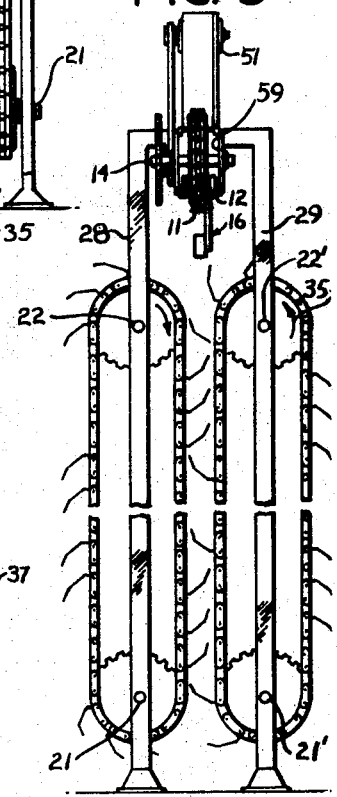
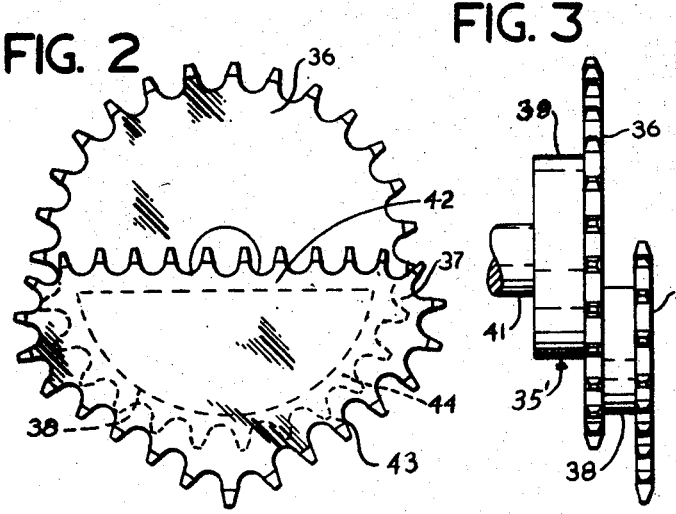
INVENTOR.
Florian F. Dauenhauer
BY Arlington L. White
Attorney

United States Patent Office 3,474,895
Patented Oct. 28, 1969

---

3,474,895
VINE CARRIER FOR HOP PICKING MACHINE
Florian F. Dauenhauer, 111–121 5th St.,
Santa Rosa, Calif. 95401
Filed Jan. 4, 1968, Ser. No. 695,772
Int. Cl. B65g 15/00, 17/00
U.S. Cl. 198—135                                    7 Claims

ABSTRACT OF THE DISCLOSURE

The present invention comprises, in combination with a hop picking machine including a pair of opposed conveyors moving in substantially vertical planes and carrying blocks of hop picking fingers arranged thereon in checker board formation to define a series of vertical transition lines between alternate blocks of picking fingers and alternate contiguous spaces, and a movable vine carrier for moving inverted suspended hop vines between the opposed conveyors whereby the suspended inverted hop vines are caused to be formed into wave-like configurations from top to bottom alternating in crests and valleys and to be swung on the vertical transition lines in pendulum-like movements first in one direction and then in the opposite direction with concomitant reversals of the formed wave-like configurations of the hop vines thereby to effect an increase in the amount of hops picked from the vines, means for recurrently stopping and resuming the movement of the vine carrier at the vertical transition lines between the blocks of picking fingers and contiguous spaces on the opposed conveyors to enhance the loading of the vines onto the vine carrier as well as the automatic release of picked vines therefrom.

---

The invention, in general, relates to the art of hop picking machines and more particularly relates to means for controlling the advance of vines to be picked through the hop picking unit of a hop picking machine.

The present invention constitutes an improvement upon my inventions in upright hop picking machines disclosed and claimed in my United States Letters Patents, Nos. 2,677,378; 2,757,785; and 2,836,128 entitled "Method and Apparatus for Picking Hops"; "Vertical Hop Picker Having Endless Carrier Chain for Hop Vines, Moving In A Vertical Plane"; and "Vine Carrier and Storage Apparatus for Hop-Picking Machines," respectively.

While the preferred embodiment of my present invention, hereinafter described, is especially suitable in the environment of the hop picking machines illustrated, described and claimed specially in my U.S. Patent No. 2,677,- 378, it is equally effective applied to other hop picking machines employing cables and rails for drawing hop vines alongside of moving hop picking fingers or between opposed banks of picking fingers moving in paths at right angles to the path of travel of the vine carrier.

A primary object of my invention is to provide an improved vine carrier embodying means controlling the movement of the carrier through a hop picking machine to insure rapid and efficient loading of the vine carrier at all times.

Another important object of the invention is to provide a vine carrier of the indicated nature which is additionally characterized by its capability of unloading stripped or picked vines with increased facility.

A still further object of my present invention is to provide an improved vine carrier for hop picking machines which embodies control means of relatively inexpensive manufacture and which is relatively easy to install and maintain.

Other objects of the invention, together with some of the advantageous features thereof, will appear from the following description of a preferred embodiment of my invention which is illustrated in the accompanying drawings. It is to be understood, however, that I am not to be limited to the precise embodiment shown, nor to the precise arrangement of the components, thereof, as my invention, as defined in the appended claims, can be embodied in a plurality and variety of forms.

Referring to the drawings:

FIG. 1 is a reduced and schematic view in elevation of a preferred embodiment of my present invention as installed in a hop picking machine.

FIG. 2 is an enlarged side elevational view of some of the elements of the preferred embodiment of my invention.

FIG. 3 is a broken side elevational view showing the mounting of the elements detailed in FIG. 2.

FIG. 4 is a front elevational detail of two control elements installed in the preferred embodiment of the invention.

FIG. 5 is an end elevational view taken from the rear of the preferred embodiment of the invention.

In its preferred form, the vine carrier of my present invention for moving hop vines in suspended state between opposed moving blocks of picking fingers of the hop picking unit of a hop picking machine preferably comprises a movable endless conveyor chain for holding a plurality of hop vines in hanging relation thereto, means for moving said endless conveyor chain, and automatically operable means for recurrently stopping and resuming the movement of said endless conveyor chain.

As illustrated schematically in FIG. 1 of the annexed drawings, an endless conveyor chain 11 is mounted, as is customary in all upright or vertical hop picking machines, immediately below a guide rail 12 and follows the same path as the rail. The chain 11 is trained over a drive sprocket 13 which is supported on a shaft 14 at the upper rear end of an endless vine carrier which includes the endless carrier chain 11 as well as a series of the vine grasping and feeding units 16, hereinafter termed graspers, which are each provided with a main hanger 17 having a wheel 18 at its top which rides along the guide rail 12. The lower end of the conveyor chain 11 passes around a reversing sprocket, all not shown, arranged at the feed end of the vine carrier where the hop vines at their butt ends are disposed between the jaws of each of the vine graspers 16 on the endless conveyor chain 11. The depending hop vines suspended from the graspers 16 are advanced, as is well known in the art, by the vine carrier or endless chain 11 between the confronting reaches of opposed picking conveyors designated generally by the reference numerals 19 and 19', see FIG. 5 of the annexed drawings. These picking conveyors are conveniently driven from a power source, not shown, connected to lower driven shafts 21 and 21' which in turn are connected to upper idler shafts 22 and 22' by sprocket and chain drive including sprockets 23 and 23' on shafts 21 and 21' respectively, and sprockets 24 and 24' on shafts 22 and 22', respectively, over which endless chains 25 and 25' are connected as shown in FIG. 5 to upper and lower sprockets 23 and 22 as well as upper and lower sprockets 23' and 22' respectively. The lower driven and upper idler shafts are journaled in suitable opposed and aligned bearings 26 and 27 at the bottom and top of the conveyors which are secured to opposed spaced apart end frame supports of which two are illustrated in FIG. 5 as indicated at 28 and 29.

Each of the picking conveyors 19 and 19' of the machine described and claimed in my aforesaid Letters Patent comprises an endless belt 31 on which are fixedly secured by means of picking finger bars a plurality of blocks 32 of individual picking fingers with the blocks arranged both horizontally and vertically in alternation with areas 33 of the belt 31 in which no picking fingers are mounted. Thus each belt 31 carries blocks of picking fingers arranged in checker-board fashion, and as the hop vines are carried on the conveyor chain 11 between the confronting faces of the opposed belts 31, each vine is swung somewhat like a pendulum or oscillated from one side to the other with the reversal of directions of oscillation occurring on what aptly may be termed vertical transitional lines, as indicated by the reference numeral 34 in FIG. 1 of the drawings. The transitional lines 34 are at the junctures of the blocks 32 of picking fingers and the finger-free areas 33 in which no picking fingers are mounted. The direction of movement of the picking finger belts is indicated by the small arrows designated by the reference numeral 35.

While my present invention is entirely suitable for adaptation to any drive mechanism in any environment, it has been especially devised for application to the drive mechanisms for vine carriers of hop picking machines and more particularly to the vine carrier of the hop picking machine described and claimed in my Letters Patent, No. 2,677,378, issued May 4, 1954 and entitled "Method and Apparatus for Picking Hops," hereinabove alluded to especially in reference to the oscillatory movement of hop vines suspended from the graspers 16 carried on the conveyor chain 11. It may be observed here that some difficulty has been encountered, particularly in respect to heavy or bushy hop vines, in automatically releasing the vines from the jaws of the graspers 16 as the graspers are carried around the rear drive sprocket 13 of the vine carrier. The continuous motion of the sprocket 13 exerts a pull on the vines as the graspers 16 are inverted in passing around such rear sprocket and many of the vines do not automatically fall off of the graspers as do the lighter, less bushy vines. Moreover, during the loading of the hop vines onto the graspers which involves successively lifting a relatively heavy load and placing a bent portion of the butt end of the vine between the jaws of each grasper 16 while in motion, the operator will inexpertly attach the vine or will miss the grasper jaws entirely with the result that dropped vines have to be retrieved from below for placement onto the graspers so that they may be picked in the usual manner by being conveyed between the confronting faces of the opposed picking finger belts.

In accordance with the present invention, I provide means for automatically stopping and automatically resuming the movement of the vine carrier or conveyor chain 11 which alleviates to a large extent the difficulties encountered with a continuously moving vine carrier inasmuch as the stopping of the movement of the conveyor chain 11 at the proper time will enable not only the dropping off from the graspers 16 of the relatively heavy vines after the hops have been stripped therefrom but also gives the loader ample time to dispose the bent portion of the butt of each vine between the jaws of a stopped grasper 16 alongside the loading platform. It may be noted here that the preferred embodiment of my invention which is illustrated in part in enlarged detail in FIG. 2 and in part in FIG. 4 of the annexed drawings, preferably is connected to the rear end sprocket 13 of the vine carrier to control the rotation thereof and thus to control the movement and the stoppage of conveyor chain 11.

As particularly illustrated in FIG. 2, one of the elements of the preferred embodiment of my invention comprises an integral unit, designated generally by the reference numeral 35', which includes a standard or conventional drive sprocket 36 and a specially constructed cam drive sprocket 37 welded by means of a hub 38 to the face of the drive sprocket 36 so as to rotate therewith. As shown in FIG. 3, the drive sprocket 36 is keyed to or otherwise mounted, as by means of a hub 39, to an axle or stub shaft 41 which is mounted for rotation in bearings secured to a bracket on the hop picking machine, all not shown, so as to be mounted in close proximity to the rear end sprocket 13 for moving the chain conveyor 11. The specially constructed cam drive sprocket 37 is eccentrically secured to the drive sprocket 36 and preferably is shaped to a semi-circle with a diameter section 42 equal to the diameter of the drive sprocket 36, and having a semi-circumference section 43 which extends below, because of its eccentric mounting, the corresponding semi-circumference section 44 of the drive sprocket which is indicated in dotted line showing in FIG. 2 of the drawings. The cam drive sprocket 37, as devised for the hop picking unit of the hop picking machine disclosed and claimed in my U.S. Letters Patent No. 2,677,378, is provided with twenty seven teeth on a five-eighth inch pitch and the drive sprocket 36 is similarly fashioned. The cam drive sprocket 37 is placed by means of a chain 45 in driving connection with a forty-five tooth sprocket 46 which is rigidly mounted on driven shaft 14 on which the rear sprocket 13 is rigidly mounted By virtue of the teeth ratio between sprockets 46 and 13, which are forty five on sprocket 46 and five teeth on sprocket 13, on each revolution of the sprockets 36 and 37 there is a three teeth rotation of driven sprocket 13. For each three teeth movement of sprocket 13, there is an eighteen inch movement of the conveyor chain 11 which is the distance between the vine graspers 16. Or, stating it another way, for each nine teeth movement of the intermediate forty five teeth drive sprocket 46, the sprocket 13 will rotate or move one tooth, and since the drive sprocket 36 and integral cam drive sprocket 37 each have twenty seven teeth, one complete revolution of sprockets 36 and 37, or three times nine, will effect a three teeth rotation of driven sprocket 13, which equals eighteen inches of conveyor chain movement.

When assembled and installed in operative position on a hop picking machine of the type disclosed in my aforementioned United States Letters Patent, the conveyor chain 11 will stop each time that the diameter section 42 of the cam drive sprocket 37 reaches a position at a slight angle to the horizontal, as shown in FIG. 1 of the annexed drawings, or assumes a position in alignment with the tangential line of said endless connecter chain 45 extending toward said cam drive sprocket 37 from the top of the intermediate drive sprocket 46, with the chain 45 between the sprockets 46 and 37 having its upper reach 47 straight and taut and with one end thereof resting upon the straight diameter section 42 of the cam drive sprocket 37, and having its lower reach 48 slack, as shown. Movement of the conveyor chain 11 will be resumed after each stoppage thereof as the drive sprocket 36 and its integral cam drive sprocket 37 leaves the position indicated in FIG. 1 so that on further rotation of such unitary sprockets 36 and 37 the conveyor chain 11 will move another eighteen inches and again stop. This recurrent stopping and starting of the conveyor chain 11 will cause one of the graspers 16 of the series of graspers, which are spaced apart on the conveyor chain 11 a distance of eighteen inches, to stop at approximately one-half way up or about the driven sprocket 13 with the jaws of the grasper open and thus enhance the dropping of a picked vine from the particular grasper so positioned and stopped, as indicated by the circle and the reference numeral 18' in FIG. 1 of the drawings. Moreover, on each stoppage of the conveyor chain 11, with the established time relation as aforesaid, one of the empty graspers 16 will be caused to stop adjacent to a loading platform, not shown, of the hop picking machine thus facilitating the loading of a hop vine between the open jaws of the grasper 16 and eliminating the likelihood of dropping the vine or inexpertly attaching the vine between the jaws of the graspers. Thus, with the arrangement for the sprockets and drive mechanisms therefor, between the successive revolutions of the cam drive sprocket 37, the conveyor chain 11 automatically and recurrently stops and starts again so as to position the graspers 16 for convenient loading of hop vines as well as insuring complete release of picked vines from the vine carrier.

The drive means for the conveyor chain 11, as illustrated in FIG. 1, includes a motor 51 having a pulley 52 on its driven shaft which is placed in driving connection by belt drive with a larger pulley 53. The motor conveniently is supported for rotation in suitable bearings carried by bracket 51' secured to a standard 54 of the frame of the machine. The pulley 53 is similarly mounted for rotation on the same standard 54, and a sprocket 56 is welded to or otherwise mounted on the same shaft ahead of the pulley 53; such sprocket 56 being connected by a chain 57 to the twenty seven tooth drive sprocket 36 carrying the cam drive sprocket 37. The drive shaft 41 of the sprocket 36 likewise is journaled in suitable bearings mounted in brackets, all not shown, secured to another standard 58 of the machine. A similar standard, not shown, is provided for supporting brackets in which bearings are mounted, also not shown, for mounting the shaft 14 of the rear driven sprocket 13 of the machine which, as above described, is driven by the intermediate drive sprocket 46 by the stop and go rotation of the cam sprocket 37 through endless connector chain 45.

The same integral unit of drive sprocket and cam drive sprocket, as indicated herein by the reference numerals 36 and 37, respectively, can be employed with effective results in any machine wherein an automatic stop and go function is desired for the drive mechanism, whether installed in other types of hop picking machines than the uprights disclosed and claimed in my aforesaid Letters Patent or in cotton pickers, beet pickers or other harvesters. The timing relation of the stopping and the resumption of movement of chain drive machines is controlled to a large extent by the construction of the cam drive sprocket in every case as well as the tooth ratio between an intermediate drive sprocket and the driven sprocket for moving the chain drive of such other machine; it being understood that such driven sprocket can have a variable number of teeth in relation to the intermediate drive sprocket, but that such cam drive sprocket must be constructed with a straight diameter section at all events although it can vary as to size or the number of teeth and the pitch thereof, as well as the number of teeth and the pitch of the teeth in the semi-circumference section thereof as long as the total number of teeth of the cam drive sprocket be the same as on the drive sprocket with which it is directly connected or on which it is mounted.

It is to be understood that the appended claims are to be accorded a range of equivalents commensurate with the advance made over the prior art.

I claim:

1. A vine carrier for hop picking machines comprising an endless conveyor chain, a driven sprocket over which said conveyor chain is trained for moving the same, control means for automatically and recurrently stopping and resuming the movement of said driven sprocket and said endless conveyor chain; said control means comprising a power means, an integral unit consisting of a first drive sprocket driven by said power means and a cam drive sprocket on said first drive sprocket; said cam drive sprocket having a straight diameter section, an intermediate drive sprocket connected to said driven sprocket, and an endless connector chain trained over said cam drive sprocket and said intermediate drive sprocket affording a driving connection therebetween for effecting movement and stoppage of movement of said intermediate drive sprocket upon each revolution of said cam drive sprocket with stoppage occurring when said straight diameter section of said cam drive sprocket assumes a position in alignment with a tangential line extending toward said cam drive sprocket from the top of said intermediate drive sprocket.

2. A vine carrier as defined in claim 1 wherein said endless connector chain is rendered inoperative upon its upper reach assuming a straight and taut position and its lower reach assumes a slack position upon each revolution of said cam drive sprocket.

3. A vine carrier as defined in claim 1, wherein the number of teeth on said driven sprocket has a predetermined ratio to the number of teeth on said intermediate drive sprocket for recurrently moving said conveyor chain a predetermined distance.

4. A vine carrier as defined in claim 3 wherein the number of teeth on said driven sprocket is five and the number of teeth on said intermediate drive sprocket is forty five for recurrently moving said conveyor chain a distance of 18 inches.

5. A vine carrier for upright picking machines comprising an endless conveyor chain, a series of vine graspers connected to said conveyor chain in spaced apart relationship for carrying hanging hop vines to be picked, a driven sprocket over which said endless conveyor chain is trained and about which the vines on said graspers are carried after being picked to be automatically dropped, a motor for moving said endless conveyor chain to and past a vine loading platform, a rotatable drive sprocket in driving connection with the shaft of said motor, a cam drive sprocket on said rotatable drive sprocket for rotation therewith, an intermediate drive sprocket connected to said driven sprocket, and an endless connector chain connecting said cam drive sprocket with said intermediate drive sprocket whereby said endless connector chain recurrently stops and resumes movement to automatically stop and resume the movement of said endless conveyor chain through the media of said intermediate drive sprocket and said driven sprocket thereby permitting each vine grasper of said series of vine graspers to be loaded at said loading platform while said conveyor chain is stopped as well as permitting picked hop vines to drop from said graspers while stopped on a path about said driven sprocket.

6. A vine carrier as defined in claim 5, wherein said cam drive sprocket comprises a straight diameter section upon which said endless connector chain recurrently lies to become inoperative to effect movement of said intermediate drive sprocket thereby stopping the movement of said conveyor chain recurrently.

7. A vine carrier as defined in claim 5, wherein the upper reach of said endless connector chain recurrently assumes a straight and taut position while engaging said straight diameter section of said cam drive sprocket and the lower reach of said endless connector chain assumes a slack position during each revolution of said cam drive sprocket to render said endless connector chain inoperative to effect movements of said intermediate drive sprocket and said driven sprocket and said endless conveyor chain.

References Cited

UNITED STATES PATENTS 2,277,458  3/1942  Schultze _____ 74—216.5
2,757,785  8/1956  Dauenhauer _____ 198—179

ROBERT G. SHERIDAN, Primary Examiner

U.S. Cl. X.R.

74—84, 216.5